United States Patent [19]
Michels et al.

[11] Patent Number: 6,105,419
[45] Date of Patent: Aug. 22, 2000

[54] APPARATUS AND PROCESS FOR INSPECTING SEALED PACKAGES

[75] Inventors: John Michels, Highland Village; Pat Bierschenk, Dallas, both of Tex.

[73] Assignee: Recot, Inc., Pleasanton, Calif.

[21] Appl. No.: 08/892,316

[22] Filed: Jul. 14, 1997

Related U.S. Application Data

[63] Continuation-in-part of application No. 08/823,752, Mar. 25, 1997, abandoned.

[51] Int. Cl.⁷ ........................................ G01M 3/34
[52] U.S. Cl. ................... 73/49.3; 73/41; 73/45.4
[58] Field of Search ............... 73/49.3, 52, 41, 73/45, 45.1, 45.4

[56] References Cited

U.S. PATENT DOCUMENTS

| | | |
|---|---|---|
| 4,090,610 | 5/1978 | Luginbühl . |
| 4,110,954 | 9/1978 | Olsson et al. . |
| 4,148,213 | 4/1979 | Prakken ............... 73/45.4 |
| 4,230,218 | 10/1980 | Kunzmann . |
| 4,330,064 | 5/1982 | Weinert . |
| 4,377,061 | 3/1983 | Olson et al. . |
| 4,380,294 | 4/1983 | Morris . |
| 4,510,730 | 4/1985 | Edmondson . |
| 4,517,827 | 5/1985 | Tapscott . |
| 4,649,740 | 3/1987 | Franklin ............... 73/49.3 |
| 4,671,101 | 6/1987 | Franklin ............... 73/49.3 |
| 4,697,452 | 10/1987 | Prakken ............... 73/49.3 |
| 4,862,732 | 9/1989 | Raymond et al. . |
| 4,922,746 | 5/1990 | Hulsman et al. . |
| 4,955,226 | 9/1990 | Beaty et al. ............... 73/49.3 |
| 5,251,422 | 10/1993 | Goodman et al. ............... 53/251 |
| 5,279,099 | 1/1994 | Goodman et al. ............... 53/53 |
| 5,284,003 | 2/1994 | Goodman et al. ............... 53/437 |
| 5,542,288 | 8/1996 | Fenlon ............... 73/49.3 |
| 5,786,530 | 7/1998 | Fenlon ............... 73/49.3 |

FOREIGN PATENT DOCUMENTS

| | | | |
|---|---|---|---|
| 238102 | 1/1965 | Austria ............... 73/41 |
| 540148 | 5/1993 | European Pat. Off. ............... 73/49.3 |
| 2162648 | 2/1986 | United Kingdom ............... 73/49.3 |
| 2172402 | 9/1986 | United Kingdom ............... 73/49.3 |
| 2259776 | 3/1993 | United Kingdom ............... 73/52 |

*Primary Examiner*—Daniel S. Larkin
*Attorney, Agent, or Firm*—Rothwell, Figg, Ernst & Kurz, P.C.

[57] ABSTRACT

An apparatus for inspecting sealed packages of product includes a conveyor belt for receiving the packages. An inspection belt contacts the packages and moves away from the conveyor belt a particular distance depending on whether the packages are properly sealed. When engaged by a package with a good seal, the inspection belt is moved a first distance which causes an indicator carried thereon to send a signal which prevents removal of the good package from the conveyor belt. However, when a leaky bag contacts the inspection belt, the inspection belt is moved a second distance which is insufficient to cause the indicator to send a signal. Consequently, the improperly sealed package is removed from the conveyor belt. The inspection belt may be mounted for linear or pivotal movement upon being contacted by the packages carried by the conveyor belt. In addition, a package engaging member can be used to press the packages prior to passing under the inspection belt to facilitate the discharge of air from leaky packages, e.g., pre-squeezing the packages.

31 Claims, 9 Drawing Sheets

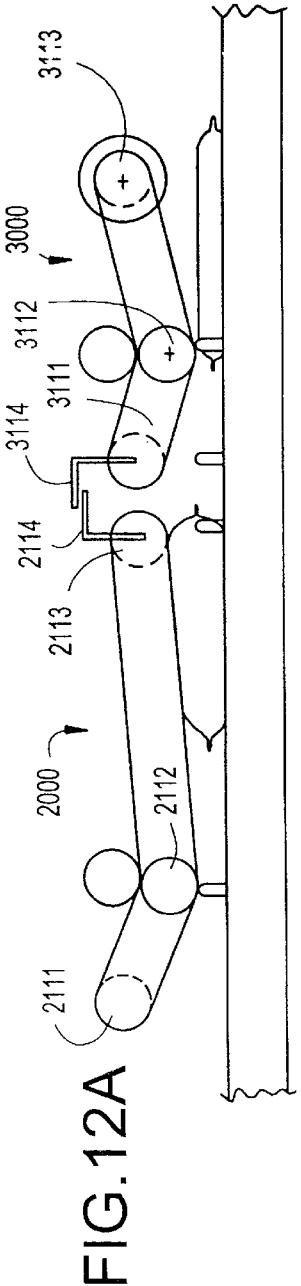
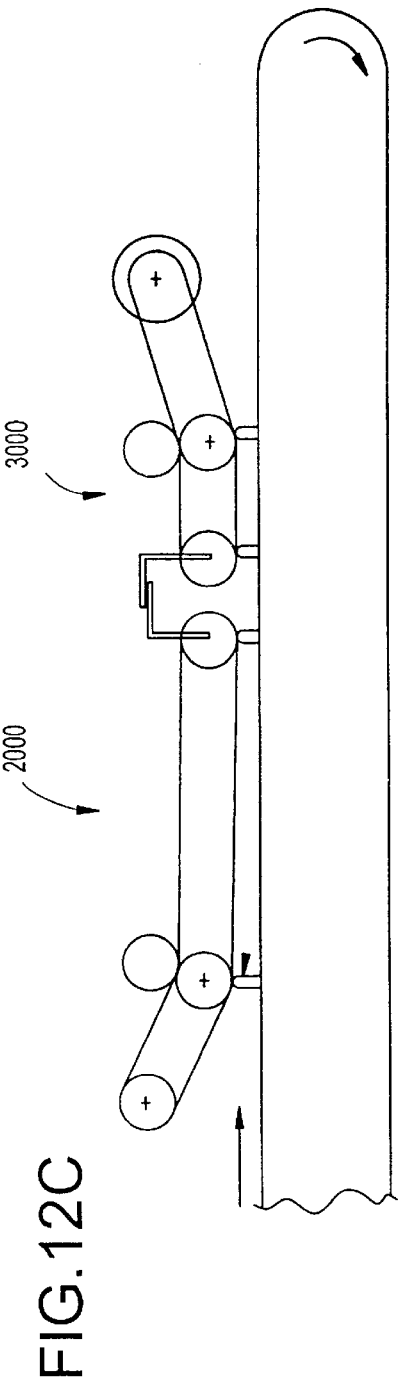
FIG.12A
FIG.12B
FIG.12C

APPARATUS AND PROCESS FOR INSPECTING SEALED PACKAGES

This application is a continuation-in-part of application Ser. No. 08/823,752, filed Mar. 25, 1997, now abandoned.

BACKGROUND OF THE INVENTION

1. Field of the Invention

The present invention pertains to the inspection of sealed packages and, more particularly, to the inspection of the integrity of sealed packages. The invention has particular application in inspecting the integrity of sealed packages containing food products, e.g., snack food products such as potato chips or the like.

2. Description of Related Art

It is generally known in the prior art to inspect sealed packages in order to determine the presence of packages having leaks therein, i.e., packages which are improperly or inadequately sealed. One such apparatus is disclosed in U.S. Pat. No. 4,148,213. The '213 apparatus conveys sealed packages between a pair of conveyor belts in order to determine the presence of leaky packages. The upper conveyor belt is spring biased in a downward direction toward the lower conveyor belt. As the packages enter the space between the two conveyor belts, the upper belt is pushed upward against the force of the spring such that the packages are clamped between the two belts. Only packages which are sealed will push the upper belt upward and will be clamped between the two belts. When a package having a leak moves between the two conveyor belts, the upper belt is not forced upwardly and the bag is not suitably clamped between the two belts. An air nozzle is mounted adjacent to the space between the two belts. The air nozzle blows air against a package located between the two belts. A package which does not contain a leak is sufficiently clamped between the two belts (due to the spring force) so as to prevent the package from being blown from between the belts. However, when a leaky package is located between the two belts, the air blown from the nozzle contacts the package and removes it from the conveyor belt. The leaky package is not clamped between the two belts with sufficient force to prevent it from being removed by the blast of air.

Another prior art device is disclosed in U.S. Pat. No. 4,697,452. The '452 apparatus includes a first conveyor belt which conveys sealed packages horizontally and underneath a pair of overlying spaced pressure belts. A gap is formed between the two pressure belts and the underlying conveyor belt through which the packages pass. A V-shaped arm is disposed in the space between the two pressure belts and extends downward into the gap so as to contact the packages moving along the lower conveyor belt. The bags conveyed by the lower conveyor belt are engaged by the pressure belts which stretch the bags taut if the bags have no leaks. A light source and photocell detect the presence of a bag and transmit a signal to remove the bag. When a bag with no leaks is located between the belts, the V-shaped arm is moved upward by the taut bag and interrupts a light beam so as to prevent the good bag from being removed. When a bag with a leak passes between the belts, the V-shaped arm is not pushed upward a sufficient distance to interrupt the light beam and thus the signal sent by the light source to the photocell results in the removal of the leaky bag.

Although considerable work has been done in the art in order to achieve systems for inspecting the integrity of sealed packages, there remains room for improvement. For example, the patents described above disclose relatively complex devices which may be susceptible to mechanical breakdown. The apparatus disclosed in the U.S. Pat. No. 4,148,213 patent includes a pair of cylinders and piston rods which control movement of the upper conveyor belt. The cylinders contain springs which bias the piston rods downward, the upper conveyor belt being connected to the piston rods. Potential problems with this apparatus include the possibility that the pistons will get out of phase with one another which would result in the upper belt being improperly moved or located relative to the lower belt. This could adversely affect the clamping pressure applied to the bags which in turn could lead to good packages being removed by the blast of air.

Likewise, the device disclosed in the U.S. Pat. No. 4,697,452 patent is a relatively complex, cumbersome system as it includes a pair of separate pressure belts disposed to overlie a package carrying conveyor belt, with a boomerang-shaped arm pivotally mounted in a gap form between the pressure belts. Potential problems in the operation of this apparatus include the possibility that the pair of overlying pressure belts could get out of sync or otherwise engage the packages in an inconsistent manner. This could result in the packages being improperly conveyed and inadequately engaging the V-shaped arm which may result in inaccurate detection of leaky packages.

In addition, the devices of the above patents do not conduct leak detection as accurately and as quickly as desired under many industry conditions. There remains a need for an improved apparatus and process for detecting the presence of improperly or inadequately sealed packages.

SUMMARY OF THE INVENTION

The present invention provides an improved apparatus for inspecting sealed packages of product in order to determine the presence of leaky packages. Leaky packages include any packages in which the integrity of the packages air tight seal has been compromised, such as due to holes in the material or due to improper formation of package seals. A conveyor belt receives sealed product packages and conveys the packages in a first direction. For example, the conveyor may receive the packages from a bag maker such as a vertical form, fill and seal device. An inspection belt is located adjacent to the conveyor belt. A package engaging member can also be disposed adjacent to the conveyor belt to contact the sealed packages prior to the inspection belt. The package engaging member squeezes the sealed packages to ensure that a sufficient amount of air can be forced out of leaky packages.

In one embodiment, the inspection belt is pivotally mounted to a support such that upon being contacted by the packages located on the conveyor belt, the inspection belt is pivoted in an upward direction. The inspection conveyor includes an indicator which may be formed integrally therewith or which may be a separate member attached thereto. A detector is provided for detecting movement of the indicator when the packages contact the inspection belt. For example, the presence of the packages on the conveyor belt may be sensed by a sensor, e.g. by a photoemitter and a photocell, which causes a signal to be sent to remove the package from the conveyor belt. Any suitable mechanism can be used to remove the packages. For example, the packages can be removed by a blast of air from a nozzle or by a movable mechanical arm or like member. When a properly sealed bag contacts the inspection belt, the belt is pivoted such that the indicator is moved upward a sufficient amount to be detected by the detector. As a result, the detector recognizes the presence of a properly sealed package and sends a suitable signal to prevent removal of the package from the belt. A microprocessor may be used to control operation of the detection systems as well as the package removal mechanism.

In another embodiment, the inspection belt is mounted on a pair of support rails, e.g., Thomson slide rails, and is moved linearly along the rails upon being contacted by the packages located on the conveyor belt. A properly sealed package slides the inspection belt a sufficient amount to cause an indicator flag which is secured thereto (or integrally formed therewith) to pass a photodetector to prevent removal of properly sealed packages in a manner similar to that described above.

In the above and other embodiments, preferably, a package engaging member is provided which has a movable belt member which can initially squeeze the packages to discharge an initial amount of air out of leaky packages. The conveyor belt and the package engaging belt may be driven at substantially the same speed and may be driven by a common drive source. Similarly, the inspection belt may be driven at the same speed as the package engaging belt and/or the conveyor belt, and also may be driven by a common drive source.

The process of the invention can include, among other processes as discussed below, steps of conveying sealed packages of product in a first direction and contacting the packages with an inspection belt such that properly sealed packages move the inspection belt a first distance and improperly sealed packages move the inspection belt a second distance, the second distance being less than the first distance. When moved the first distance, the inspection belt sends a signal, for example by interrupting a light beam, which prevents the properly sealed package from being removed from the conveyor belt. In contrast, when moved the second distance (or not moved at all), the inspection belt does not send a signal which results in the improperly sealed package being removed from the conveyor belt. The process preferably also includes the step of pressing the packages with a package engaging member before the step of contacting the packages with the inspection belt.

The above and other advantages, features and aspects of the present invention will be more readily perceived from the following description of the preferred embodiments thereof taken together with the accompanying drawings and claims.

BRIEF DESCRIPTION OF THE DRAWINGS

Other objects, features, and benefits of the present invention will become apparent from the following detailed description of preferred embodiments thereof taken in conjunction with the accompanying figures, wherein:

FIGS. 12(A)–12(C) are side elevational views of the embodiment shown in FIG. 11 illustrating operation of the device. In particular, FIG. 12(A) illustrates operation when a leaky bag is under the inspector conveyor, FIG. 12(B) illustrates operation when a proper bag is under the inspector conveyor, and FIG. 12(C) illustrates the apparatus when no bags are present.

DETAILED DESCRIPTION OF THE PREFERRED EMBODIMENTS

Figure 1:
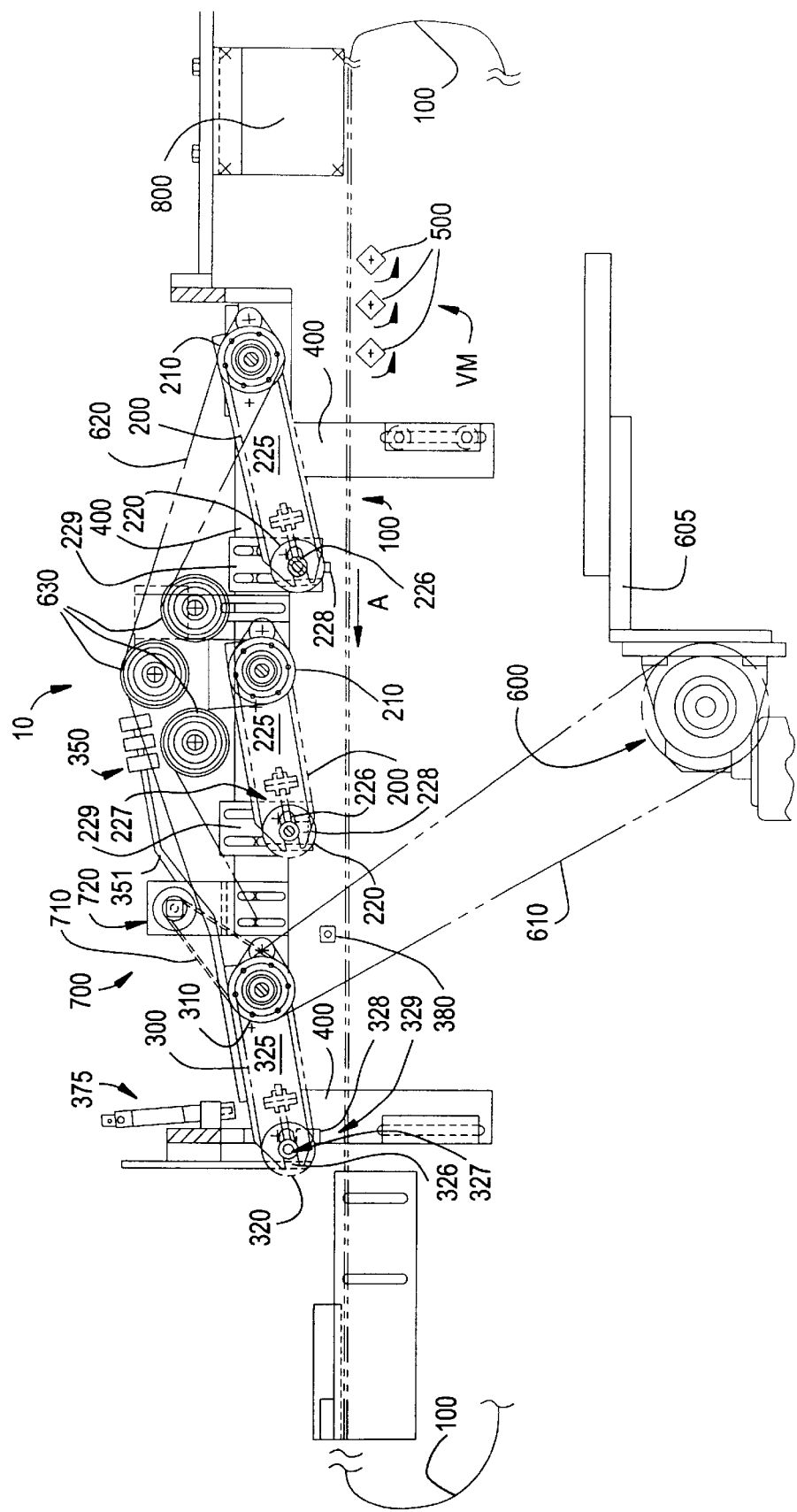
FIG. 1 is a side elevation view of an apparatus for inspecting sealed packages of product according to a first embodiment of the invention.
Figure 2:
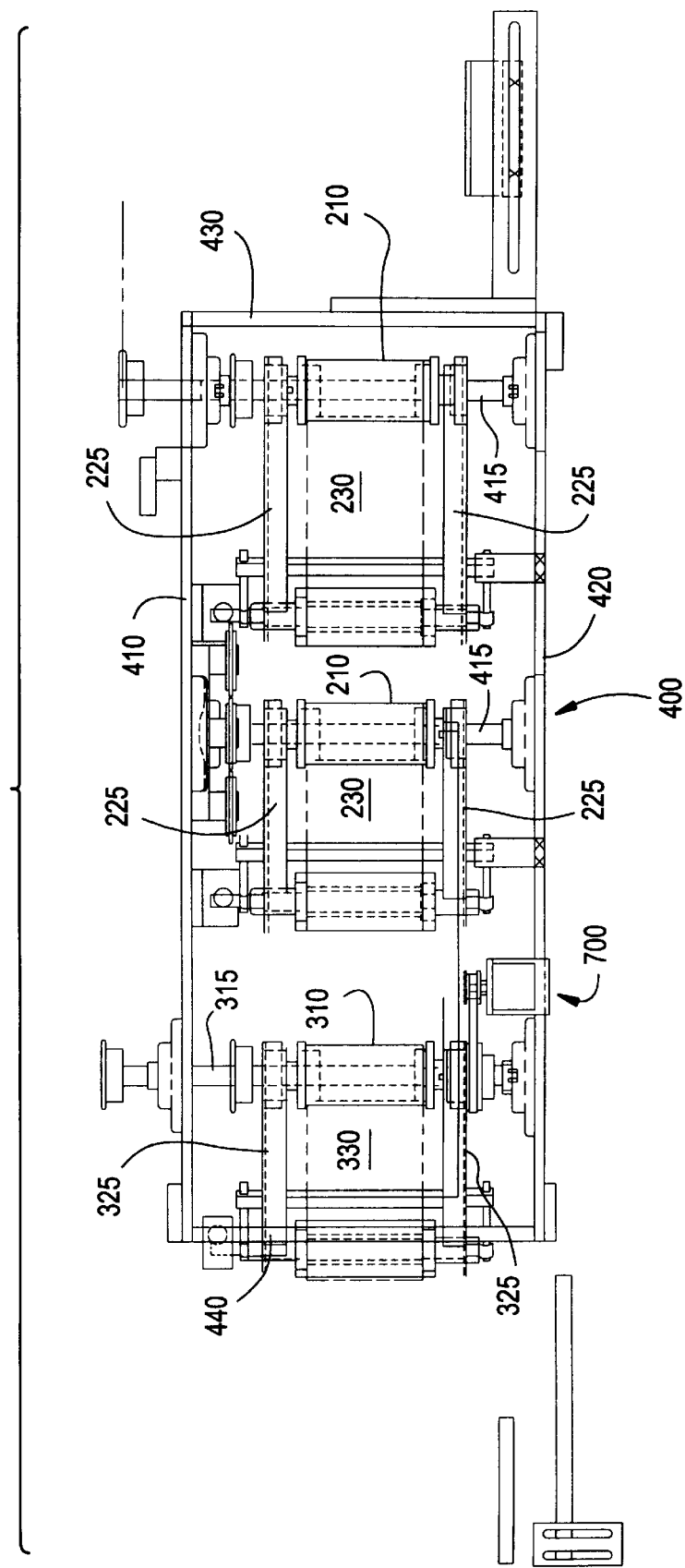
FIG. 2 is a top view of the apparatus shown in FIG. 1.

With reference to FIG. 1, a first embodiment of the present invention is indicated generally by the reference numeral 10. The first embodiment illustrates a number of aspects of the invention combined into a single system. In FIG. 1, a rotated conveyor belt 100 has an upper surface that is moved in the direction A (to the left in FIG. 1) and that conveys bags thereon. In the illustrated embodiment, a plurality of conditioning conveyors 200 are included. The conditioning conveyors 200 can be used to press the bags prior to entry below the inspection conveyor 300. In this manner, the conditioning conveyors 200 can enhance the accuracy of the system by increasing the retention time during which the packages are subject to squeezing pressure. This ensures that an appreciable amount of air is expelled and that an accurate reading is obtained—e.g., ensuring that leaky packages are flattened sufficiently. The conveyors 200 and 300 are supported on an inspection system mounting bracket 400. As best shown in FIG. 2, the support 400 preferably includes opposite side frame members 410, 420, 430 and 440. The conveyors 200 and 300 each include drive rollers 210 and 310, respectively, and idler rollers 220 and 320, respectively. The drive rollers 210 and 310 are rotatably mounted on support shafts 415 and 315 which are mounted to the support 400. The conveyors 200 and 300 include arms 225 and 325, respectively, which extend between the rollers 210 and 220 and 310 and 320, respectively, to support the respective rollers a fixed distance relative to one another. The conveyor belts 330 and 230 are, thus, supported by and around the respective roller pairs. The arms 225 and/or arms 325 can include slots 226 and/or 326 so as to allow lateral adjustment of the positions of the idler rollers 220 and/or 320; if desired, the positions can be fixed by, for example, screws. Tracking devices 227 and/or 327 can also be included for the conveyor belts 230 and 330. Spring tensioning can be provided, if desired, to allow relative movement along slots 226 and 326 to maintain constant tension of the belts.

Means VM for vibrating the belt is preferably provided upstream of the inspection conveyor in order to cause the contents of the bags to settle and allow the bags to be more freely pressed without damaging the contents and/or the bags. In a preferred embodiment, the means for vibrating includes a plurality of square rollers 500 which contact the conveyor belt. As shown, the rollers 500 are preferably located upstream of the conveyors 300 and 200. The rollers vibrate the conveyor 100 to cause agitation within the bags. The rollers 500 can, alternatively, be located downstream of the conditioning conveyors 200 (where conveyors 200 are used). However, it is preferable to flatten out the contents, e.g., chips, before pressing the contents to avoid damaging the contents and/or the packages.

In operation, bags are conveyed along the conveyor 100 and below the conditioning conveyors 200. As the bags pass under the conveyors 200, the rollers 220 are raised and the arms 225 pivot around the drive roller shafts 415. A rubber stop 228, or the like, can be provided to limit the downward movement of the rollers 220. The stops preferably are situated to abut a lower edge of the arms 225 or the like. Brackets 229 can be used to support the stops 228. An electrical enclosure 800 can also be mounted to the support 400, if desired, in order to provide needed electrical circuitry or the like as would be understood by those in the art based on this disclosure.

The inspection conveyor 300 pivots in a similar manner and can include a similar stop 328 as well as a similar bracket 329. The inspection conveyor can also include an inspector counterweight 350 to reduce the effective weight of the inspector conveyor against the bags passing thereunder. The counterweight 350 is preferably mounted at the end of an arm 351 as shown. The arm is fixedly connected to move with the conveyor 300, such as being fixed to one of the arms 325. A damping cylinder 375 can also be located at the downstream side of the conveyor 300. The damping cylinder 375 can operate to dampen upward motion of the inspection conveyor and/or to limit upward movement, such as, for example, by abutting an arm 325. Preferably, a sensor 380 is also provided. The sensor 380 can be used to sense the presence of a bag before it enters the inspection conveyor 300 in order to alert the system of the presence of a bag.

In one embodiment, as shown, the conveyor belts 330 and 230 are operated via a drive motor 600. The motor 600 can rotate the drive roller 310 via a drive chain 610. A belt 620 can be used to respectively rotate the drive rollers 210. As shown, guide rollers 630 can be used to guide the belt 620 to drive the rollers 210. The motor 600 can be mounted on a motor mount 605 as shown.

As also shown, an encoder 700 can be included, e.g., to measure the angular displacement of the conveyor 300. The encoder can be used, for example, to determine the amount of movement of the inspector conveyor 300 to, for example, accommodate the particular size or type of bags being evaluated. The encoder 700 can include a cog belt 710 mounted to the conveyor frame as shown in FIGS. 1–2. The encoder can include an encoder mount 720.

Figure 3:
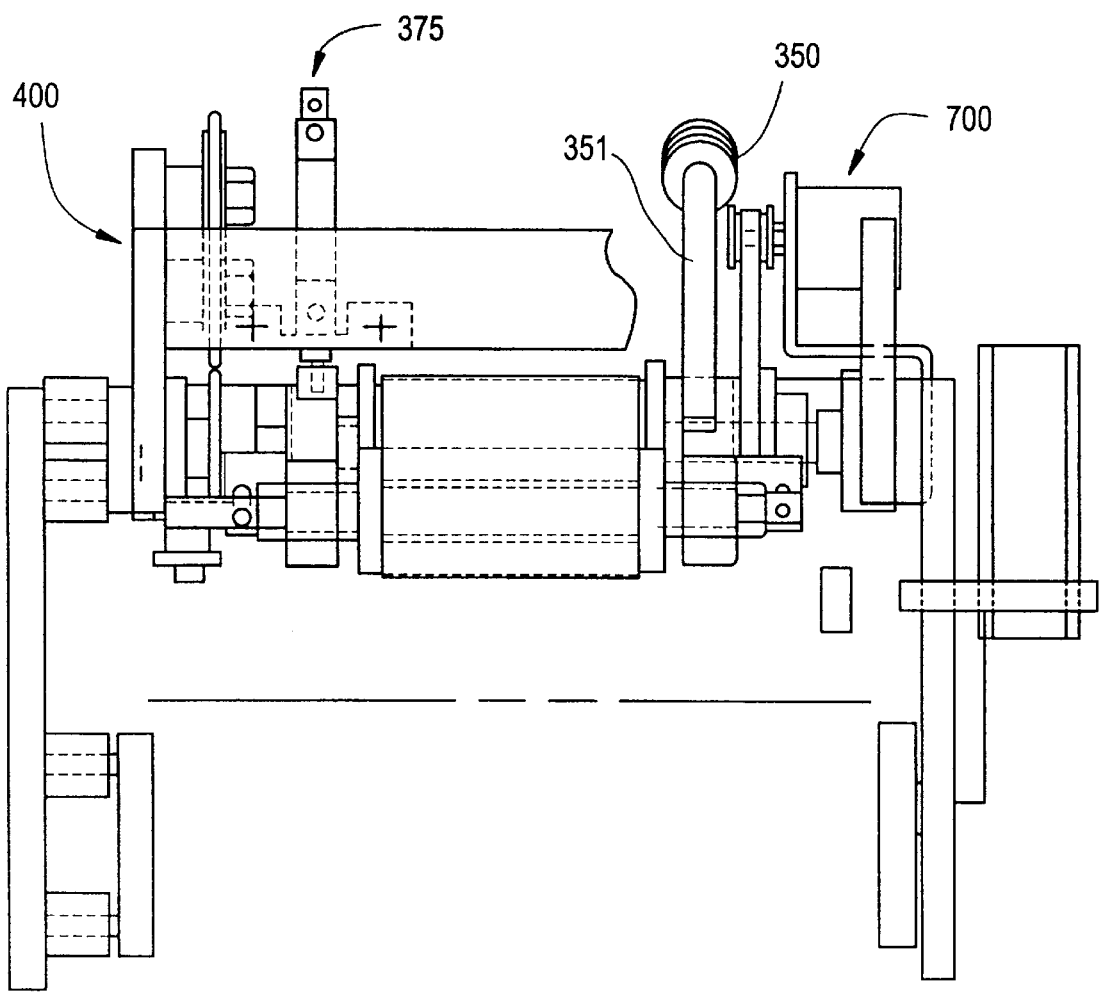
FIG. 3 is a front elevational view of the apparatus shown in FIG. 1.
Figure 4:
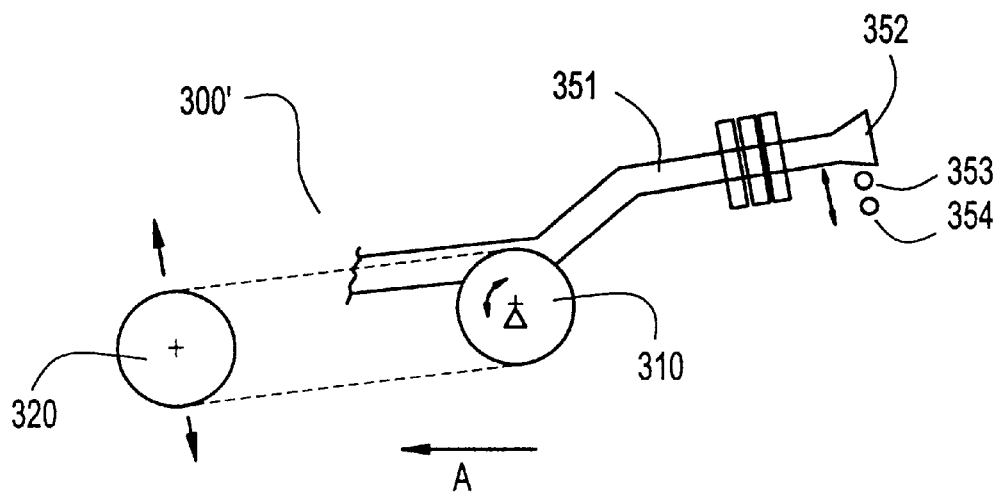
FIG. 4 is a side elevational view of an alternative embodiment similar to that shown in FIG. 1.

FIG. 4 illustrates an embodiment which can be used as an alternative to the encoder 700. FIG. 4 shows an inspector conveyor 300' which can, if desired, be used in a system like that in FIGS. 1–3 with the conveyor 300' replacing the conveyor 300. The arrow A illustrates the direction in which bags are passed under the device 300'. The end of the arm 351 includes a flag 352. Additionally, a plurality of sensors are included—for example, a sensor 353 senses small bags and a sensor 354 senses large bags. When a small bag passes through, the belt deflects a smaller amount than when a large bag passes through. Although two sensors are shown, more sensors could be used. The use of an encoder 700 is preferable because it enables a greater range of measurements. For example, even with the same size bags, sometimes the air fill is different, such as for different uses and conditions. Accordingly, it may not be as practical to include as many sensors as would possibly be desired. As an example of one preferred embodiment, the cog belt 710 can be configured to impart a 3:1 rotation wherein the encoder rotates, for example, 9 degrees when the conveyor rotates 3 degrees, so as to provide a higher resolution. The encoder can be used not to merely show if a certain level is reached, but to show a range within that level. On the other hand, a proximity sensor can only tell if a certain level is reached or not. The information of the encoder can be displayed for each bag and can be displayed on a screen for the operator.

Figure 5:
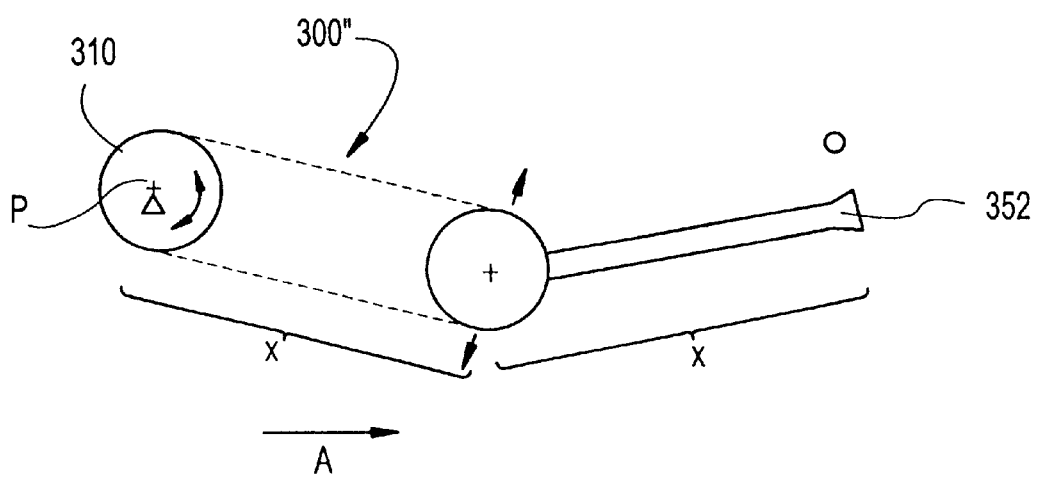
FIG. 5 is a side elevational view of another alternative embodiment similar to that shown in FIG. 1.

FIG. 5 illustrates another embodiment having an inspection conveyor 300". The inspector conveyor 300" can, if desired, be used in a system like that in FIGS. 1–3 with the conveyor 300" replacing the conveyor 300. The arrow A illustrates the direction in which bags are passed under the device 300". This embodiment increases the relative height traveled by the flag 352 when the conveyor pivots around the point P. Preferably, the length of the arm supporting the flag 352 is approximately the same or larger than the length X of the conveyor 300".

Figure 6:
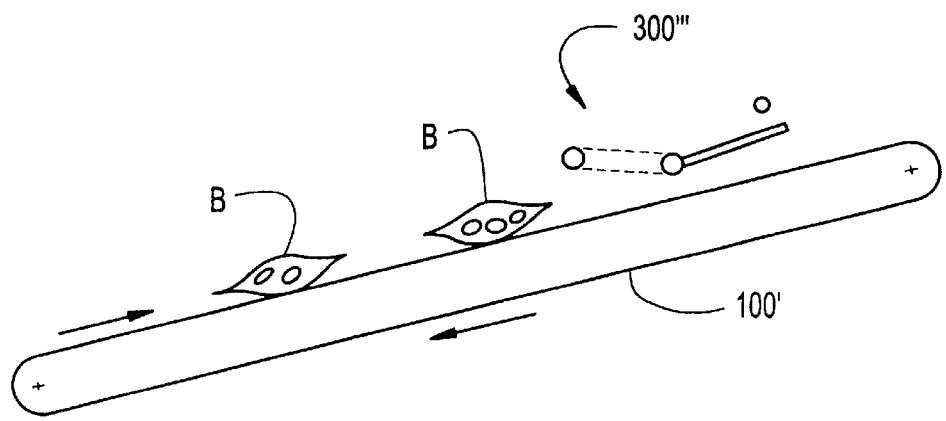
FIG. 6 is a schematic side elevational view of the embodiment shown in FIG. 5 included within a system having a conveyor.
Figure 7:
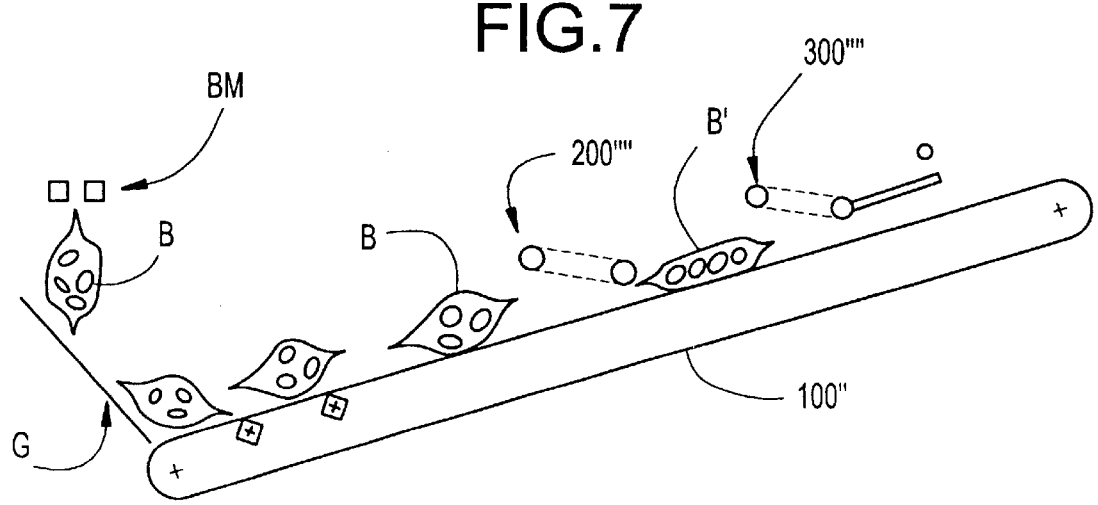
FIG. 7 is a schematic side elevational view of the embodiment shown in FIG. 5 included within a system having a conveyor and an initial conditioning belt.

FIGS. 6 and 7 further schematically illustrate how the invention can be used and operated. For example, the conveyors 100' and 300''' shown in FIG. 6 can be driven at the same speed, such as by a common drive or by separate drives. As shown, the bags B can be moved along the conveyors and brought beneath the inspection conveyor 300'''. As further shown in FIG. 7, conditioning conveyors 200'''' can be also be used. In addition, FIG. 7 further schematically illustrates how bags B can be directed to a conveyor 100'' via a guide G as bags B are discharged from the bag maker BM (common bag sealing jaws being illustrated). As shown in FIG. 7, the use of a conditioning conveyor, such as 200'''' shown, is preferred because it ensures that a sufficient amount of air is squeezed from a leaky package, e.g., removing an initial amount of air or flattening out the bag such as bag B' shown. At the inspection belt, the presence of a good or bad bag B can, thus, be more easily detected.

Figure 8:
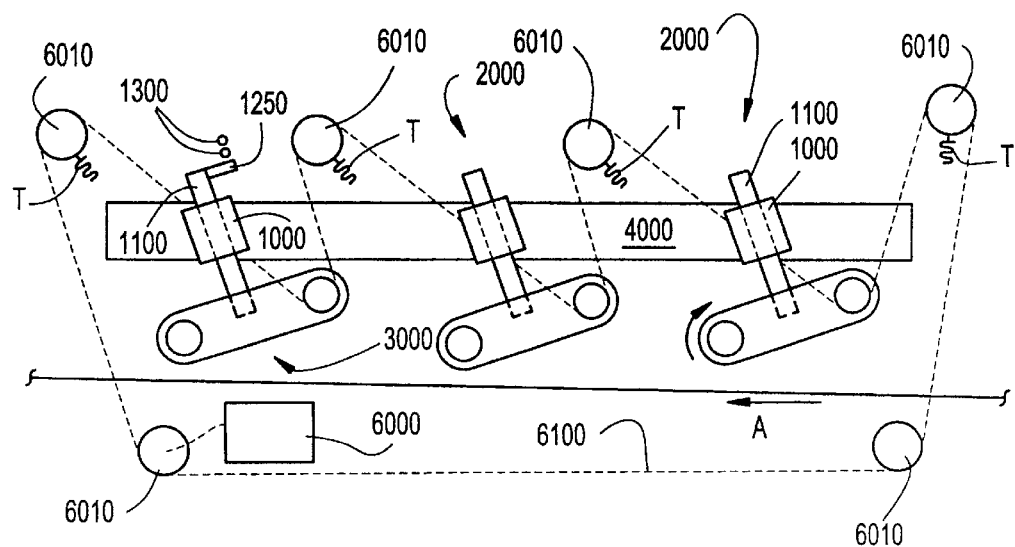
FIG. 8 is a side elevational view of another embodiment of the invention.

FIG. 8 shows another alternative embodiment of the invention having a different means for supporting the respective conveyors. In the illustrated embodiment, the conditioning conveyors 2000 and the inspection conveyor 3000 are mounted via Thomson slides 1000 and Thomson rails 1100. Preferably, the Thomson rails 1100 are supported on the conveyor 2000/3000, such as on arms similar to arms 325 discussed above.

Parts not illustrated in any of the above embodiments can be incorporated from other embodiments as would be apparent to those in the art. For example, FIG. 8 does not illustrate the particular arms between the drive and idler rollers (e.g., arms 225 and 325). However, such could be like that of other embodiments discussed above. In this regard, the support 4000, motor 6000, drive chain 6100, and pulleys 6010 could operate in a similar manner to the embodiment shown in FIG. 1 to rotate respective drive rollers. Height limiting means can also be included, as well as bottom stops. In addition, the conveyors 2000 and/or 3000 can be counterbalanced, if desired, such as via appropriate pulleys and cables connected to bias the conveyors upwardly along the Thomson slides and rails. The device can also be adapted to include an encoder like the encoder 700. Known structure transferring linear motion to rotational movement (e.g., gears and belts, etc.) can be used when a rotational encoder is used. As illustrated in FIG. 8, multiple sensors 1300 and a flag 1250 could be used in a similar manner to the embodiments discussed above with respect to FIGS. 1 and 4.

In the embodiment shown in FIG. 8, each of the conditioning belts and the inspection belt move up and down independently. Spring loaded tensioners T can be used to maintain tension of the chain 6100 as the conveyor belts go up and down. It should be understood that the illustrated drive mechanism is merely one illustrative embodiment, and those in the art would readily recognize in view of the present disclosure that other arrangements can be used. In another preferred embodiment, the conditioning belts and the inspector belts would not be mutually connected in a manner that could impart movement to the inspector conveyor when one or more of the conditioning conveyors are raised (such as by another bag). In this regard, for example, separate drive chains could be used and/or the tensioning mechanism could be adapted to prevent unwanted movement of the inspector belt.

Figure 9:
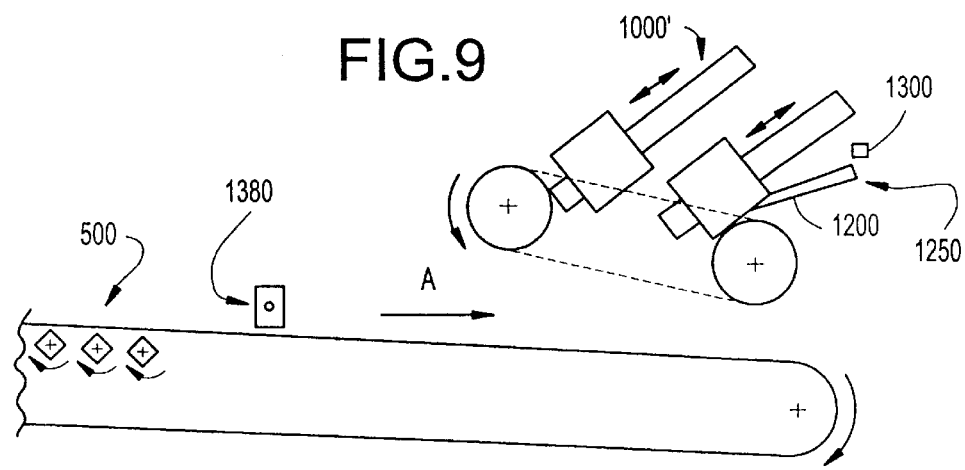
FIG. 9 is a side elevational view of another embodiment which is similar to that shown in FIG. 8.

FIG. 9 illustrates an embodiment similar to that shown in FIG. 8 and using two respective Thomson guides and rails. FIG. 9 also illustrates an arm 1200 and a flag 1250 which operate in conjunction with the sensor 1300 in a like manner to that of the inspection conveyor 300 above. It is contemplated that the number of Thomson slides and rails can be varied as required. In contrast to the preferred embodiment shown, in an alternative embodiment, the attachment of the slides and rails could be reversed, e.g., the slides being attached to the conveyors. In one preferred construction, three slides and rails will be included for each conveyor. Slides and rails could also be provided at left and right sides of the conveyors (e.g., doubling the number shown).

Figure 10:
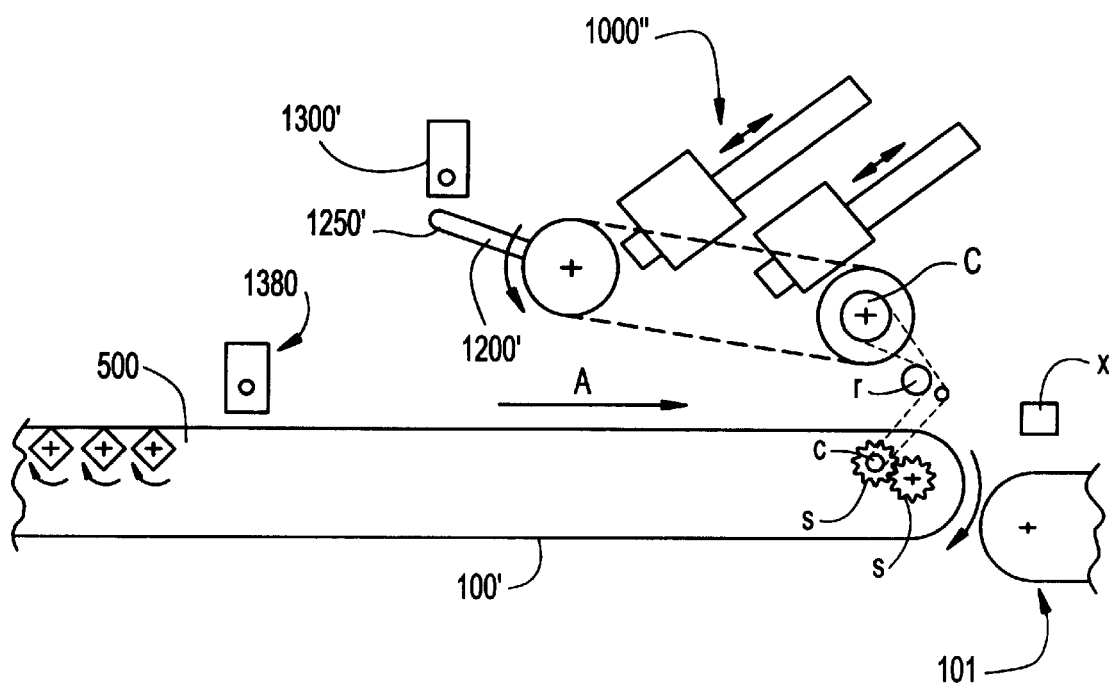
FIG. 10 is a side elevational view of another embodiment which is similar to that shown in FIGS. 8 and 9.

In operation, the conveyors 2000 and 3000 (as with the previously discussed conveyors 200 and 300) preferably move up and down easily and predictably every time. When a properly sealed bag passes thereunder, the conveyor slides up and the flag 1250 passes before the sensor eye 1300. However, prior to passing under these conveyors, a bag passes the photo-sensor eye 1380. As a result, the device is alerted via appropriate circuitry and/or software that a good bag has passed. In such a case, no action is required. If a leaky bag is present, the conveyor will not slide up (or will slide too little) so that the sensor 1300 will not be activated. Thus, if, for example, the sensor 1380 senses a bag and the sensor 1300 does not sense the flag, the system can be alerted that a bad bag has passed. In this case, the bag can be appropriately discharged, such as via an air blasting means. The air blasting means can, for example, laterally discharge air against the side of the bag. FIG. 10 illustrates an embodiment similar to that in FIG. 9 with the arm 1200', the sensor 1300' and the flag 1250' at an upstream position. In one embodiment, a bad bag can be laterally discharged at a location of a second conveyor 101, such as by an air blaster X. Alternatively, a bad bag can be pushed or tapped off, such as with an air cylinder and a corresponding cylinder rod (not shown). As also shown in FIG. 10, and as discussed above, the conveyor 100' and the conveyor 1000" can be driven via the same drive means—for example, with sprockets S, a take up roller r, and cog pulleys C.

In the preferred construction, as shown, the Thomson rails are angled from the vertical axis. Preferably, the angle is about 45 degrees. In this manner, among other benefits, smaller vertical increments in bag heights will result in greater travel of the conveyor. This can, for example, facilitate sensing of the travel of the conveyors.

In one preferred construction, the inspection conveyor used will be initially positioned about ½" below the minimum acceptable air fill amount in the bags. Thus, as a good bag is conveyed between the inspection conveyor and the lower conveyor upon which the bags rest, the air fill within the bag will cause the inspection conveyor to slide or pivot upwards.

The present invention has substantial advantages over other known devices. The system is reliable and efficient. The present invention better facilitates running at higher speeds and continued performance. When used in conjunction with Pack assist equipment, the pack assist can more easily be run at higher speeds.

The package engaging members, e.g., preconditioning conveyors, which are utilized in the preferred embodiments also enable a high detection accuracy. For example, the device can be constructed so that small holes, e.g., pin-holes, will expel a sufficient amount of air. This allows the device to have a very high accuracy of leak detection and to operate at a very high rate. Furthermore, the pivoted conveyors, in certain embodiments, can help avoid having the surfaces of the conveyor block holes in the bag. When a bag contacts such a pivoted conveyor, the pivoted conveyor can initially squeeze one end of the bag and gradually pivot over portions of the bag from the one end to the other, such that a hole in a side of the bag can more freely discharge air.

Figure 11:
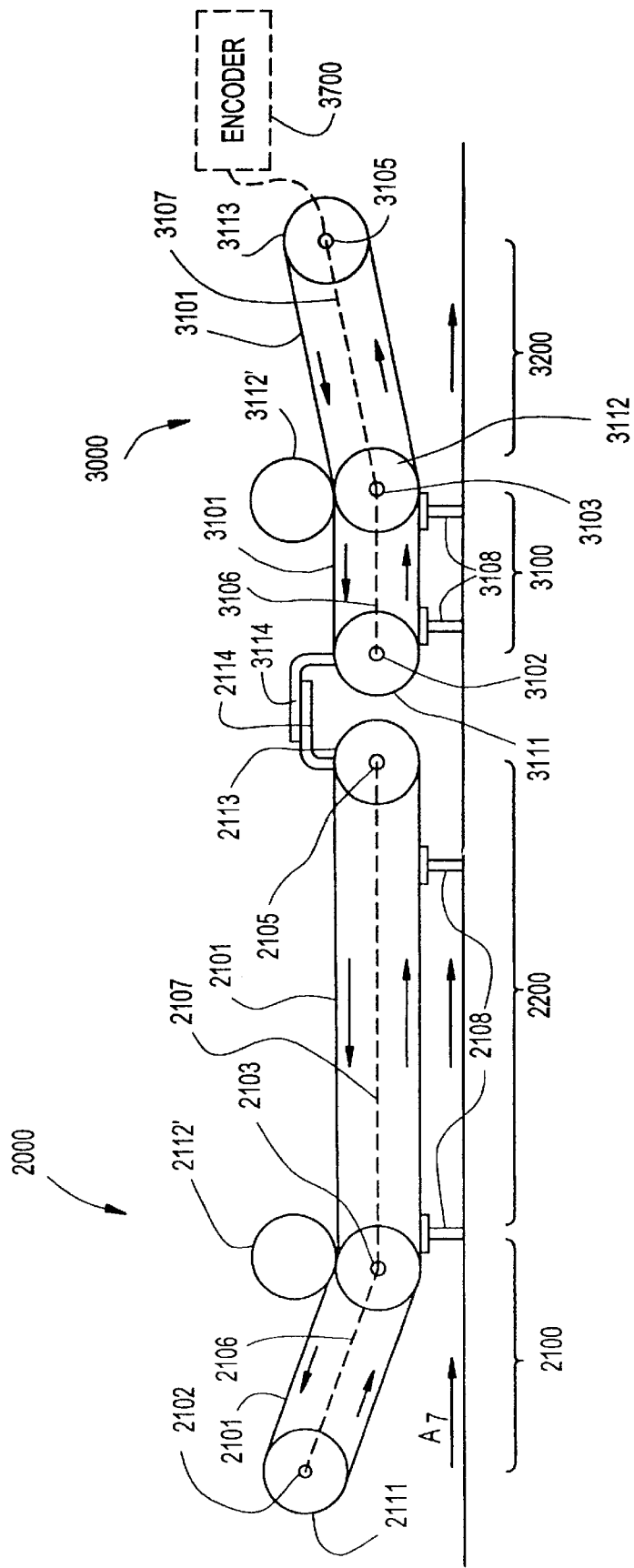
FIG. 11 is a side elevational view of an additional embodiment having modified conditioner and inspector conveyors.

In addition to the above discussed embodiments, FIGS. 11 and 12(A)–12(C) show an additional embodiment—a most preferred embodiment—having modified conditioning and inspecting conveyors. Among other things, this additional embodiment helps to reduce product damage within the bags. This embodiment reduces product damage that can be caused when a bag enters beneath or exits from beneath a conveyor. This embodiment can be used to provide a smooth transition of pressure on the bags as they pass beneath the conveyors, so that the conveyors do not squeeze a portion of a bag in a manner that can cause damage of the product therein. As shown in FIG. 11, the conditioning conveyor 2000 includes two relatively movable sections 2100 and 2200 and the inspection conveyor 3000 includes two relatively movable sections 3100 and 3200.

With respect to the conveyor 2000, a conveyor belt 2101 preferably extends around both of the sections 2100 and 2200. The section 2100 includes two pulleys 2111 and 2112 which are rotatably mounted on shafts 2102 and 2103, respectively. A support member 2106 (shown schematically with dotted lines) can be used to maintain the shafts 2102 and 2103 at their relative positions. The shaft 2102 is at a fixed location (e.g., fixed relative to a side support or frame, not shown) and the shaft 2103 is free to pivot around the shaft 2102. The section 2200 includes the pulley 2112 and the pulley 2113. The pulley 2113 is supported on the shaft 2105, which is also free to pivot around the shaft 2103. Section 2200 can also include a support member 2107 (shown schematically with dotted lines) to maintain the shafts 2103 and 2105 at their relative positions. As a result, when a bag traveling in the direction A, in FIG. 11, enters beneath the conditioning conveyor 2000, the conveyor will raise to accommodate the bag. As shown in FIG. 12(B), the bag under the conditioning conveyor 2000 will transition relatively smoothly beneath the pulley 2112. As the bag passes underneath, section 2100 will pivot upwards and section 2200 will freely elevate. Preferably, at least one stop member 2108 abuts the support member 2107 to delineate a lowermost position thereof. As with the above-noted conditioning conveyors, the conveyor 2000 can be used to press the bags prior to entry below the inspection conveyor 3000. In this manner, the conditioning conveyor 2000 can enhance the accuracy of the system by increasing the retention time during which the packages are subject to squeezing pressure. This ensures that an appreciable amount of air is expelled and that an accurate reading is obtained—e.g., ensuring that leaky packages are flattened sufficiently. In order to maintain the conveyor in a proper position, an additional idler pulley 2112' can be utilized.

In order to smoothly transfer the bag to a position underneath the inspection conveyor 3000, a lead in bracket 2114 is preferably fixed to the member 2107 at the downstream side of the section 2200. The bracket 2114 is configured to contact another bracket 3114 attached to the inspection conveyor 3000, so as to raise the inspection conveyor an appropriate distance and allow the bag to be smoothly transferred as shown in FIG. 12(A).

The inspector 3000 includes a conveyor belt 3101 supported on three pulleys 3111, 3112, and 3113. The section 3100 includes pulleys 3111 and 3112 which are rotatably mounted on shafts 3102 and 3103, respectively. Section 3100 can also include a support member 3106 (shown schematically with dotted lines), that maintains the shafts 3102 and 3103 at their relative positions. The shafts 3102 and 3103 are free to pivot around, or move relative to, one another. The section 3200 includes pulleys 3112 and 3113. The pulley 3113 is supported on the shaft 3105, which is at a fixed location (e.g., fixed to a side support or frame, not shown). Section 3200 also includes a support member 3107 (shown schematically with dotted lines) which supports the shafts 3103 and 3105 at their relative positions. As a result, when a bag traveling in the direction A, in FIG. 11, enters beneath the inspection conveyor 3000, the conveyor will raise to accommodate the bag. As shown in FIG. 12(B), the bag under the inspection conveyor 3000 will transition relatively smoothly beneath the pulley 3112. As the bag passes underneath, section 3100 will elevate and section 3200 will pivot upwards. Preferably, at least one stop member 3108 abuts the support member 3106 to delineate a lowermost position thereof. (In addition, an idler pulley 3112' similar to the pulley 2112' can be included.).

Preferably, an encoder 3700, similar to the encoder 700 discussed above, is included at the shaft 3105 to carry out the inspection. Although less preferred, the device could use flags and sensors as utilized in some of the above-noted embodiments. Preferably, the flags would be mounted to the member 3107 proximate the upstream end so that the flag is raised a greater degree when the section 3200 pivots around the shaft 3105. Detection can be easily made because a bad bag, illustrated at the right side of FIG. 12(A), will not pivot the section 3200 as much as a good bag, illustrated at the right side of FIG. 12(B).

In an alternative less preferred construction, the conveyor belts 2101 and/or 3101 could be replaced by two separate belts which extend around each of the sections 2100 and 2200 and/or each of the sections 3100 and 3200, respectively. The separate belts could include side-by-side belt portions enabling the belts to be supported on the same pulley 2112 and/or 3112.

In another less preferred alternative embodiment, the inspection conveyor 3000 can be replaced with another conveyor similar to the conditioning conveyor 2000. That is, as with some of the earlier discussed embodiments, the inspection conveyor can be made to have a similar construction to the conditioning conveyor 2000. However, certain benefits of the embodiment shown in FIGS. 11 and 12(A)–12(C) would not be experienced.

While the present invention has been shown and described with reference to preferred embodiments presently contemplated as best modes for carrying out the invention, it is understood that various changes may be made in adapting the invention to different embodiments without departing from the broader inventive concepts disclosed herein and comprehended by the claims which follow.

What is claimed is:

1. An apparatus for inspecting sealed packages of product, the apparatus comprising:
   a conveyor belt for receiving sealed packages of product and conveying the packages in a first direction;
   an inspection belt disposed adjacent to said conveyor belt, said inspection belt being pivotally connected to a support wherein the inspection belt pivots upon being contacted by the packages located on said conveyor belt;
   a detector for detecting movement of said inspection belt upon said inespection belt being contacted by the packages;
   a package engaging member disposed adjacent to said conveyor belt, said package engaging member contacting the sealed packages of product on the conveyor belt to facilitate discharging of air from a leaky package, the inspection belt being disposed downstream of the package engaging member;
   wherein said package eagaging member is a movable belt member which applies pressure against the packages; and
   wherein said movable belt member has one end pivotally connected to said apparatus to permit said belt member to pivot when contacted by the packages.

2. An apparatus according to claim 1, wherem said conveyor belt, said movable belt member, and said inspection belt are driven at substantially the same speed.

3. An apparatus according to claim 1, wherein said inspection belt is pivotally connected at a first end thereof, and an indicator is located at a second end thereof.

4. An apparatus according to claim 1, wherein said conveyor belt is disposed at an angle relative to a horizontal plane.

5. An apparatus according to claim 1, wherein said conveyor belt and said inspection belt are driven at substantially the same speed.

6. An apparatus according to claim 1, further comprising a sensor disposed adjacent said conveyor and upstream of said inspection belt for sensing a presence of packages on said conveyor belt.

7. An apparatus according to claim 1, wherein said inspection belt extends around a first inspection belt section having one end pivotably attached to said support and a second inspection belt section that is pivotally connected to said first inspection belt section at an end opposite said one end, and wherein said movable belt member of said package engaging member extends around a first package engaging member section having one end pivotally attached to a support and a second package engaging member section that is pivotally connected to said first package engaging member section at an end opposite said one end.

8. An apparatus according to claim 7, wherein said second inspection belt section has a bracket member that is arranged to be raised by a corresponding bracket member attached to said second package engaging member section so as to raise said second inspection belt section when a package is beneath said second package engaging member section.

9. An apparatus for inspecting sealed packages of product the apparatus comprising:
   a conveyor belt for receiving sealed packages of product and conveying the packages in a first direction;
   an inspection belt disposed adjacent to said conveyor belt, said inspection belt being pivotally connected to a support wherein the inspection belt pivots upon being contacted by the packages located on said conveyor belt;
   a detector for detecting movement of said inspection belt upon said inspection belt being contacted by the packages; and wherein said detector is a photoelectric sensor which receives light emitted by a photoemitter.

10. An apparatus for inspecting sealed packages of product, the apparatus comprising:
- a conveyor belt for receiving sealed packages of product and conveying the packages in a first direction;
- an inspection belt disposed adjacent to said conveyor belt, said inspection belt being pivotally connected to a support wherein the inspecton belt pivots upon being contacted by the packages located on said conveyor belt;
- wherein said inspection belt includes an indicator which moves therewith upon said belt being contacted by the packages;
- a detector for detecting movement of said indicator belt upon said inspection belt being contacted by the packages; and
- wherein said indicator is an elongated member having one end connected to an end of said inspection belt and an opposite end disposed away from said inspection belt, and further including a flag located away from the one end of the elongated member, wherein movement of said flag is detected by said detector.

11. An apparatus according to claim 10, wherein said elongated member forms an angle with said inspection belt.

12. An apparatus according to claim 11, wherein said flag is located a predetermined distance from the pivoted connection of the inspection belt which distance is selected at least in part based on the angle between the elongated member and the inspection belt.

13. An apparatus according to claim 10, wherein said detector is a photoelectric sensor which detects light emitted by a photoemitter.

14. An apparatus for ispecting seal quality for leaks in sealed packages of product, the apparatus comprising:
- a conveyor belt for receiving sealed packages of product and conveying the packages in a first direction;
- an inspection belt disposed adjacent to said conveyor belt and being movably mounted on a support wherein the inspection belt moves away from said conveyor upon being contacted by the packages located on said conveyor belt;
- a detector for detecting movement of said inspection belt upon said inspection belt being contacted by the packages; and
- a package engaging member located upstream of the inspection belt which presses the packages to facilitate discharging of air from a leaky package;
- said package engaging member having an inclined lower surface which contacts and is raised by packages on the conveyor belt; and
- said package engaging member being free from any position detection means such that detection is conducted only at said inspection belt.

15. An apparatus according to claim 14, further comprising means for engaging the packages to settle product therein before the packages are engaged by said package engaging member.

16. An apparatus according to claim 14, wherein said inspection belt is slidably mounted on at least one support rail so as to be movable toward and away from said conveyor belt.

17. An apparatus according to claim 16, wherein said conveyor belt and said inspection belt are driven at substantially the same speed.

18. An apparatus according to claim 17, wherein a common drive source is provided for said conveyor belt and for said inspection belt.

19. An apparatus according to claim 16, further comprising means for removing packages having faulty seals from said conveyor belt.

20. An apparatus for inspecting sealed packages of product, the apparatus comprising:
- a conveyor belt for receiving sealed packages of product and conveying the packages in a first direction;
- an inspection belt disposed adjacent to said conveyor belt, said inspection belt being pivotally connected to a support wherein the inspection belt pivots upon being contacted by the packages located on said conveyor belt;
- a detector for detecting movement of said inspection belt upon said inspection belt being contacted by the packages; and
- wherein said inspection belt extends around a first section having one end pivotally attached to said support and a second section that is pivotally connected to said first section at an end opposite said one end.

21. An apparatus for inspecting sealed packages of product, the apparatus comprising:
- a conveyor belt for receving sealed packages of product and conveying the packages in a first direction;
- an inspection belt disposed adjacent to said conveyor belt and being movably mounted on a support wherein the inspection belt moves away from said conveyor belt upon being contacted by the packages located on said conveyor belt;
- detector for detecting movement of said inspection belt being contacted by the packages; and
- wherein said inspection belt extends around a first section having one end pivotally attached to said support and a second section that is pivotally connected to said section at an end opposite said one end.

22. An apparatus for inspecting seal quality for leaks in sealed packages of product, comprising:
- a conveyor belt for receiving sealed packages of product and conveying the packages in a first direction;
- an inspection belt disposed adjacent to said conveyor belt and being movably mounted on an inspection belt support such that said inspection belt moves away from said conveyor belt upon being contacted by packages on said conveyor belt;
- a detector for detecting movement of said inspection belt upon said inspection belt being moved by contact with said packages; and
- a separate package-engaging belt disposed upstream of said inspection belt and being movably mounted on a package-engaging belt support such that said package-engaging belt moves away from said conveyor belt by the force of contact with packages located on said conveyor belt;
- wherein said package-engaging belt has a lower package contact surface that is inclined with respect to an upper surface of said conveyor belt such that packages upon said conveyor belt contact said inclined surface so as to raise said package-engaging belt;
- whereby said package-engaging belt discharges air from leaky packages prior to inspection of the packages performed at the inspection belt; and
- wherein said package-engaging belt is free from any measurement devices.

23. An apparatus according to claim 22, wherein said detector is an encoder.

24. An apparatus according to claim 22, wherein said detector is a photodetector.

25. An apparatus for inspecting seal quality for leaks in sealed packages of product, comprising:

a conveyor belt for receiving sealed packages of product and conveying the packages in a first direction;

an inspection belt disposed adjacent to said conveyor belt;

support means for supporting said inspection belt to contact packages on the conveyor belt and to move away from said conveyor belt by the force of contact with the packages on said conveyor belt;

a detector for detecting movement of said inspection belt due to contact with the packages;

a separate package-engaging member disposed upstream of said inspection belt;

engaging member support means for supporting said package-engaging member to contact packages on the conveyor belt and to move away from said conveyor belt by the force of contact with the packages on said conveyor belt while applying sufficient force via the package-engaging member to discharge air from leaky packages prior to the inspection of the packages performed separately at the inspection belt; and wherein said package-engaging member and said package engaging support means are free from any measurement devices such that movement of said package-engaging member is not measured.

26. An apparatus according to claim 25, wherein said package-engaging member is a pre-conditioning conveyor.

27. A method of inspecting seal quality for leaks in sealed packages, comprising the steps of:

conveying sealed packages in a first direction via a conveyor belt;

providing an inspection belt adjacent to said conveyor belt;

upwardly moving the inspection belt by contacting the inspection belt with packages on the conveyor belt so as to move the inspection belt upward from said conveyor belt by the force of contact with the packages on said conveyor belt;

detecting the movement of said inspection belt due to contact with the packages;

providing a separate package-engaging member disposed upstream of said inspection belt;

upwardly moving the package-engaging member by contacting the package-engaging member with the packages on the conveyor belt so as to move the package-engaging member upward from the conveyor belt by the force of contact with the packages on said conveyor belt while applying sufficient downward force via the package-engaging member to discharge air from leaky packages prior to the inspection of the packages performed separately at the inspection belt; and keeping movement of said package-engaging member undetected and not measured for inspecting leaks.

28. The method of claim 27, wherein said step of providing said package-engaging member includes providing said package-engaging member from a package-engaging belt.

29. The method of claim 28, wherein said step of upwardly moving said package-engaging belt includes providing a bottom surface of said package-engaging belt at an angle with respect to a surface of said conveyor belt to allow packages to contact said bottom surface and move said package-engaging belt upward.

30. A method of inspecting sealed packages, comprising the steps of:

conveying sealed packages in a first direction via a conveyor belt;

providing an inspection belt adjacent to said conveyor belt;

upwardly moving the inspection belt by contacting the inspection belt with packages on the conveyor belt so as to move the inspection belt upward from said conveyor belt by the force of contact with the packages on said conveyor belt;

detecting the movement of said inspection belt due to contact with the packages;

providing a separate package-engaging member disposed upstream of said inspection belt; and upwardly moving the package-engaging member by contacting the package-engaging member with the packages on the conveyor belt so as to move the package-engaging member upward from the conveyor belt by the force of contact with the packages on said conveyor belt while applying sufficient downward force via the package-engaging member to discharge air from leaky packages prior to the inspection of the packages performed separately at the inspection belt;

wherein said step of providing said package-engaging member includes providing said package-engaging member from a package-engaging belt; and wherein said step of upwardly moving said package-engaging belt includes pivoting said package-engaging belt upon contact with packages.

31. A method of inspecting sealed packages, comprising the steps of:

conveying sealed packages in a first direction via a conveyor belt;

providing an inspection belt adjacent to said conveyor belt;

upwardly moving the inspection belt by contacting the inspection belt with packages on the conveyor belt so as to move the inspection belt upward from said conveyor belt by the force of contact with the packages on said conveyor belt;

detecting the movement of said inspection belt due to contact with the packages;

providing a separate package-engaging member disposed upstream of said inspection belt; and upwardly moving the package-engaging member by contacting the package-engaging member with the packages on the conveyor belt so as to move the package-engaging member upward from the conveyor belt by the force of contact with the packages on said conveyor belt while applying sufficient downward force via the package-engaging member to discharge air from leaky packages prior to the inspection of the packages performed separately at the inspection belt;

wherein said step of providing said package-engaging member includes providing said package-engaging member from a package-engaging belt; and wherein said step of upwardly moving said package-engaging belt includes supporting said package-engaging belt via slides and rails.

* * * * *